(12) United States Patent
Asakura et al.

(10) Patent No.: US 10,532,736 B2
(45) Date of Patent: Jan. 14, 2020

(54) VEHICLE TRAVEL CONTROL DEVICE

(71) Applicant: HONDA MOTOR CO., LTD., Minato-ku, Tokyo (JP)

(72) Inventors: Masahiko Asakura, Wako (JP); Hironobu Kiryu, Wako (JP); Hitoshi Konishi, Wako (JP); Takuyuki Mukai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/772,137

(22) PCT Filed: Oct. 5, 2016

(86) PCT No.: PCT/JP2016/079638
§ 371 (c)(1),
(2) Date: Apr. 30, 2018

(87) PCT Pub. No.: WO2017/077807
PCT Pub. Date: May 11, 2017

(65) Prior Publication Data
US 2018/0312161 A1 Nov. 1, 2018

(30) Foreign Application Priority Data
Nov. 6, 2015 (JP) .................................. 2015-218431

(51) Int. Cl.
*B60W 30/02* (2012.01)
*B60W 10/04* (2006.01)
(Continued)

(52) U.S. Cl.
CPC ............... *B60W 30/02* (2013.01); *B60T 7/12* (2013.01); *B60W 10/04* (2013.01);
(Continued)

(58) Field of Classification Search
CPC ..... B60T 7/12; B60T 7/22; B60T 8/17; B60T 8/1755; B60W 10/04; B60W 10/18;
(Continued)

(56) References Cited

U.S. PATENT DOCUMENTS 5,485,378 A * 1/1996 Franke ................. B62D 15/025
348/118
5,646,845 A * 7/1997 Gudat ................ B60K 31/0008
701/26
(Continued)

FOREIGN PATENT DOCUMENTS

| JP | 06-230826 | 8/1994 |
|---|---|---|
| JP | 10-076964 | 3/1998 |

(Continued)

OTHER PUBLICATIONS

International Search Report and Written Opinion for International Application No. PCT/JP2016/079638 dated Dec. 6, 2016, 13 pages.
(Continued)

*Primary Examiner* — Angelina Shudy
*Assistant Examiner* — Mohamed Abdo Algehaim
(74) *Attorney, Agent, or Firm* — Amin, Turocy & Watson, LLP

(57) ABSTRACT

Provided is a vehicle travel control device which simultaneously achieves the behavioral stability of a vehicle and the continuity of travel assistance during vehicle travel assistance. The setting range of controlled variable to an actuator in travel assistance control is limited on the basis of the information having higher priority among road type information and road shape information. Thus, compared to when the setting range of the control variable is determined on the basis of only the road type information or the road shape information, it is possible to suppress excessive limitations on the applicable range/duration time of travel assistance.

6 Claims, 7 Drawing Sheets

(51) Int. Cl.
- *B60W 10/184* (2012.01)
- *B60W 10/20* (2006.01)
- *B60W 30/09* (2012.01)
- *B60T 7/12* (2006.01)
- *B62D 6/00* (2006.01)

(52) U.S. Cl.
CPC .......... *B60W 10/184* (2013.01); *B60W 10/20* (2013.01); *B60W 30/09* (2013.01); *B62D 6/001* (2013.01); B60T 2210/20 (2013.01); B60W 2550/10 (2013.01); B60W 2550/14 (2013.01); B60W 2550/141 (2013.01); B60W 2710/06 (2013.01); B60W 2710/18 (2013.01); B60W 2710/207 (2013.01)

(58) Field of Classification Search
CPC .... B60W 10/184; B60W 10/20; B60W 30/02; B60W 30/09; B60W 30/04; B60W 30/045; B60W 30/08; B60W 30/18154; B60W 30/18145; B60W 40/06; B60W 40/064; B60W 40/068; B60W 40/072; B60W 40/066; B62D 6/001; B62D 6/007; G08G 1/16; G05D 1/0088
USPC .......................................................... 701/41
See application file for complete search history.

(56) References Cited

U.S. PATENT DOCUMENTS

| | | | | |
|---|---|---|---|---|
| 6,009,374 A * | 12/1999 | Urahashi | ............ | B60K 31/0058 701/36 |
| 6,188,316 B1 | 2/2001 | Matsuno et al. | | |
| 6,392,535 B1 | 5/2002 | Matsuno et al. | | |
| 7,392,120 B2 * | 6/2008 | Matsumoto | ......... | B60T 8/17557 180/168 |
| 7,630,807 B2 * | 12/2009 | Yoshimura | ............... | B60K 6/46 701/48 |
| 8,473,144 B1 * | 6/2013 | Dolgov | ............... | B60W 30/095 701/28 |
| 8,706,402 B2 * | 4/2014 | Suzuki | ............ | B60W 30/18009 701/23 |
| 8,718,861 B1 * | 5/2014 | Montemerlo | ......... | B60W 30/00 701/26 |
| 8,818,606 B2 * | 8/2014 | Lee | ........................ | B60W 10/20 701/23 |
| 8,831,813 B1 * | 9/2014 | Ferguson | ................ | B60T 7/042 701/23 |
| 9,031,761 B2 * | 5/2015 | Koshizen | .............. | B60W 30/16 701/96 |
| 9,090,260 B2 * | 7/2015 | Clarke | .................. | B60W 30/00 |
| 9,257,043 B2 * | 2/2016 | Kim | ........................ | G08G 1/167 |
| 9,302,659 B2 * | 4/2016 | Moran | .................. | B60T 8/1755 |
| 9,463,804 B2 * | 10/2016 | Szwabowski | ....... | B60W 40/072 |
| 9,507,016 B2 * | 11/2016 | Sudou | ................ | B60K 31/0008 |
| 9,527,441 B2 * | 12/2016 | Matsumura | .............. | B60Q 9/00 |
| 9,950,740 B2 * | 4/2018 | Sato | ...................... | B62D 15/025 |
| 10,095,227 B2 * | 10/2018 | Ichikawa | ............. | G05D 1/0061 |
| 10,118,641 B2 * | 11/2018 | Fujita | ...................... | B62D 6/00 |
| 10,186,150 B2 * | 1/2019 | Aoki | ................. | B60W 50/0097 |
| 10,310,508 B2 * | 6/2019 | Kunisa | ................. | G05D 1/0061 |
| 2008/0042814 A1 * | 2/2008 | Hurwitz | ................ | B60Q 9/008 340/435 |
| 2009/0024319 A1 | 1/2009 | Tsuji | | |
| 2009/0037070 A1 * | 2/2009 | Nakamura | ............ | B60W 30/16 701/96 |
| 2009/0248768 A1 * | 10/2009 | Fukumoto | ............. | B60W 10/06 708/207 |
| 2013/0110343 A1 * | 5/2013 | Ichikawa | ............. | B60W 50/10 701/23 |
| 2013/0197736 A1 * | 8/2013 | Zhu | ...................... | G05D 1/0088 701/26 |
| 2013/0218367 A1 * | 8/2013 | Shikimachi | ............. | G06F 17/00 |
| 2016/0039395 A1 * | 2/2016 | Niwa | ............. | B60W 30/18109 701/70 |
| 2016/0137197 A1 * | 5/2016 | Hayakawa | ............. | B60K 26/04 701/70 |
| 2017/0320521 A1 * | 11/2017 | Fujita | ...................... | B62D 6/00 |
| 2018/0218601 A1 * | 8/2018 | Aoki | ................. | B60W 50/0097 |

FOREIGN PATENT DOCUMENTS

| | | |
|---|---|---|
| JP | 11-255004 | 9/1999 |
| JP | 2009-25048 | 2/2009 |

OTHER PUBLICATIONS

Japanese Office Action for Japanese Patent Application No. 2017-548680 dated Sep. 24, 2019.

* cited by examiner

| ROAD TYPE RD | ENVIRONMENTAL RESTRICTION AMOUNT Aer |
|---|---|
| GENERAL ROAD | EQUIVALENT TO 0.2 G |
| EXPRESSWAY (MAIN LINES WITH MEDIAN STRIP) | EQUIVALENT TO 0.25 G |
| EXPRESSWAY (BRANCHING, MERGING PATHS) | EQUIVALENT TO 0.25 G |
| EXPRESSWAY (RAMP OR THE LIKE WITH SMALL RADIUS OF CURVATURE) | EQUIVALENT TO 0.3 G |
| EXPRESSWAY (NO MEDIAN STRIP) | EQUIVALENT TO 0.2 G |

VEHICLE TRAVEL CONTROL DEVICE

TECHNICAL FIELD

The present invention relates to a vehicle travel control device that controls driving (steering, driving, braking, etc.) of a vehicle, and which at least partially assists such driving during traveling of the vehicle.

BACKGROUND ART

In paragraphs [0022] to [0026] of Japanese Laid-Open Patent Publication No. 06-230826 (hereinafter referred to as JP1994-230826A), a control technique is disclosed in which, in a vehicle to which an automatic steering control that automatically performs steering is applied, a maximum steering angle is set in accordance with the radius of curvature of a road, corresponding to the speed limit (maximum speed) of an expressway when traveling on the expressway.

In FIG. 1 of Japanese Laid-Open Patent Publication No. 10-076964 (hereinafter referred to as JP1998-076964A), a vehicle travel control device concerned with automated driving is disclosed, which is equipped with a throttle actuator, a steering actuator, and a brake actuator.

In paragraphs [0014], [0022], [0077], [0080], and [0083] of JP1998-076964A, a control technique is disclosed in which, when an automatic steering operation is suspended due to a sensor detection error such as a white line detecting sensor or the like, while initially continuing with automated driving in addition to regulating an automatic steering device (regulating in this case implies maintaining a steering angle or alternatively a yaw rate=0 in accordance with map information), the automated driving is suspended under predetermined conditions (for example, when it is detected that the driver has grasped the steering wheel).

SUMMARY OF INVENTION

Taking into consideration the techniques disclosed in JP1994-230826A and JP1998-076964A, in an automated driving control, the following drawbacks can be suppressed by executing a restriction in accordance with information of the environment in the vicinity of the road, such as a speed limit (maximum speed) when traveling on an expressway or map information, or a restriction on the steering angle of automatic steering at the time of an abnormality in the automated driving.

More specifically, it is possible to suppress a defect in which an erroneous automatic steering control is performed in a manner so that a target steering angle becomes excessive, and the automatically driven vehicle deviates significantly from the travel path.

However, if the steering angle is uniformly restricted in accordance with information of the environment in the vicinity of the road, for example, by maintaining the steering angle in accordance with the map information, then when traveling on a steep curve having a large curvature (a small radius of curvature) or the like, a situation may arise in which a necessary steering angle corresponding to the steep curve having a large curvature or the like cannot be generated by the automatic steering control.

In such a case, it is necessary to take countermeasures such as canceling the automatic steering control and entrusting steering to the driver, which raises the possibility that the continuity range (applicable range) for automated driving will be narrowed more than necessary, and thus, there is room for improvement.

The present invention has been devised taking into consideration the aforementioned problems, and has the object of providing a vehicle travel assist control device, which is capable of ensuring both stability in the behavior of a vehicle during a travel assist control, together with enabling continuity of the travel assist (maintaining the travel assist for as long as possible).

A vehicle travel control device according to the present invention is characterized by a vehicle travel control device configured to automatically control an actuator of a vehicle to at least partially assist driving when the vehicle is traveling, comprising a road type acquisition unit configured to acquire information of a road type on which the vehicle travels, a road shape acquisition unit configured to acquire information of a road shape of a frontward road in front of a location where the vehicle is traveling, a control amount setting unit configured to set a control amount of the actuator required for traveling on the frontward road, and a setting range restricting unit configured to restrict a setting range of the control amount on a basis of one of information items having a higher priority from among the information of the road type and the information of the road shape.

According to the present invention, since the setting range of the control amount to the actuator in the travel assist control is restricted on the basis of one of the information items having a higher priority from among the information of the road type and the information of the road shape, compared to a case in which the setting range of the control amount is determined based on only one such information item, it is possible to prevent the restriction on the control amount from being mitigated more than necessary, and to suppress the occurrence of an excessive output by the actuator which has been set with the mitigated control amount, and together therewith, conversely, it is possible to prevent the control amount from being restricted more than necessary, and to suppress the applicable range or the continuation time of the driving assistance from being made too narrow. As a result, it is possible to achieve both stability of the vehicle behavior during the travel assist control and continuity of the travel assist.

In this case, the setting range restricting unit may be configured to define the setting range of the control amount, which is restricted based on the information of the road type acquired by the road type acquisition unit, as an environmental restriction amount, and define the setting range of the control amount, which is restricted based on the information of the road shape acquired by the road shape acquisition unit, as a necessary restriction amount, and restrict the setting range of the control amount on a basis of a smaller value from among the necessary restriction amount and the environmental restriction amount.

With such a configuration, since it is possible to set priorities to the environmental restriction amount and the necessary restriction amount which are set respectively in accordance with the road type information and the road shape information, the setting range of the control amount is restricted based on the smaller of such values, whereby it is possible to achieve both stability of the vehicle behavior during the travel assist control and continuity of the travel assist.

Further, the control amount of the actuator required for traveling on the frontward road, which is set by the control amount setting unit, may be defined as a necessary control amount, and the setting range restricting unit may be configured to define as the necessary restriction amount a value obtained by adding a control mitigation amount to the necessary control amount, and set the control mitigation amount so as to adopt a smaller value as the necessary control amount becomes larger.

In this manner, by defining as the necessary restriction amount the value obtained by adding the control mitigation amount to the necessary control amount, it is possible to suppress a control amount which is restricted excessively with respect to a slight increase in the necessary control amount.

Further, since it is possible to reduce the amount by which the necessary restriction amount is increased accompanying the increase in the necessary control amount, in the case that the necessary restriction amount on the basis of the road shape information is lower than the environmental restriction amount on the basis of the road type information, from the fact that it becomes difficult to change the setting value from the necessary restriction amount to the environmental restriction amount, it is possible to improve the tracking ability of the output of the actuator with respect to the road shape.

Furthermore, in a case that the necessary control amount is a value exceeding the environmental restriction amount, or alternatively, is a value exceeding a corrected environmental restriction amount obtained by subtracting a predetermined restriction amount from the environmental restriction amount, a travel assist control for the vehicle may be at least partially canceled or prohibited.

In the case that the necessary control amount of the actuator required for the vehicle to travel on the frontward road exceeds the environmental restriction amount set by the road type information, or the corrected environmental restriction amount obtained by subtracting the predetermined restriction amount from the environmental restriction amount, it is difficult for the travel assist control to follow or track with respect to the road shape of the road type at the point in time when such an excess takes place. Therefore, by canceling or prohibiting the travel assist control, for example, it is possible to stop the vehicle or transition the driving thereof to the vehicle occupant, thereby making it possible to prevent the travel assist control from becoming unstable.

Further still, there may further be provided an obstacle detecting device configured to detect an obstacle in vicinity of the vehicle, wherein the setting range restricting unit may be configured to change the setting range of the control amount depending on a possibility of the vehicle coming into contact with the obstacle detected by the obstacle detecting device.

In accordance with such a configuration, in the travel assist control, it is possible to reduce the possibility of contact with an obstacle accompanying an excessive output of the actuator.

Further still, the vehicle travel control device may further comprise a steering angle setting unit configured to set a steering angle on a basis of a travel direction of the vehicle, an automatic steering device configured to automatically steer the actuator so as to attain the steering angle set by the steering angle setting unit, and an automatic acceleration/deceleration device configured to automatically control acceleration and deceleration of the vehicle. The road shape acquisition unit may further comprise a curvature acquisition unit configured to acquire a road curvature of the road in the frontward travel direction of the vehicle. The environmental restriction amount may be set as a value that restricts the steering angle during automatic steering, on a basis of the information of the road type acquired by the road type acquisition unit, and the setting range restricting unit may be configured to restrict the steering angle on the basis of a smaller value from among the environmental restriction amount and the necessary restriction amount, and together therewith, in a case that the road curvature acquired by the curvature acquisition unit is a value exceeding a threshold curvature, automatic steering by the automatic steering device may be canceled or prohibited, or the vehicle may be configured to be decelerated by the automatic acceleration/deceleration device.

In accordance with the above-described configuration, in the case that the curvature of the road becomes a value in excess of the threshold curvature, by canceling or prohibiting automatic steering, it is possible to prevent the automatic steering control from becoming unstable.

Alternatively, in the case that the curvature of the road becomes a value in excess of the threshold curvature, by causing the vehicle to decelerate, since the necessary steering angle becomes smaller than the necessary steering angle for the same curvature of the road, the continuity of the automatic steering control can be improved.

Further still, the environmental restriction amount may be set as a value that restricts the acceleration and deceleration in the automatic acceleration/deceleration device on the basis of the information of the road type acquired by the road type acquisition unit, the necessary restriction amount may be set as a value that restricts the acceleration and deceleration in the automatic acceleration/deceleration device on the basis of the information of the road shape acquired by the road shape acquisition unit, and the setting range restricting unit may be configured to restrict the acceleration and deceleration that is automatically controlled by the automatic acceleration/deceleration device on the basis of a smaller value from among the environmental restriction amount and the necessary restriction amount.

In accordance with the above-described configuration, even in the automatic acceleration/deceleration control, since priorities can be assigned to the environmental restriction amount and the necessary restriction amount which are set respectively for the road type and the road shape, it is possible to achieve both stability of the vehicle behavior and continuity of automated driving.

According to the present invention, since the setting range of the control amount to the actuator that performs the travel assist control is restricted on the basis of one of the information items having a higher priority from among the information of the road type and the information of the road shape, compared to a case in which the setting range of the control amount is determined based on only one such information item, it is possible to prevent the restriction on the control amount from being mitigated more than necessary, and to suppress the occurrence of an excessive output by the actuator which has been set with the mitigated control amount, and together therewith, conversely, it is possible to prevent the control amount from being restricted more than necessary, and to prevent the applicable range or the continuation time of the driving assistance from being made too narrow. As a result, it is possible to achieve both stability of the vehicle behavior of the vehicle during travel assistance and continuity of the travel assist (maintaining the travel assist for as long as possible).

BRIEF DESCRIPTION OF DRAWINGS

FIG. 4 is a characteristic chart for describing an environmental restriction amount, a necessary restriction amount, a necessary control amount, a control prohibition region, and the like;

DESCRIPTION OF EMBODIMENTS

Preferred embodiments of a vehicle travel control device according to the present invention will be described in detail below with reference to the accompanying drawings.

Figure 1:
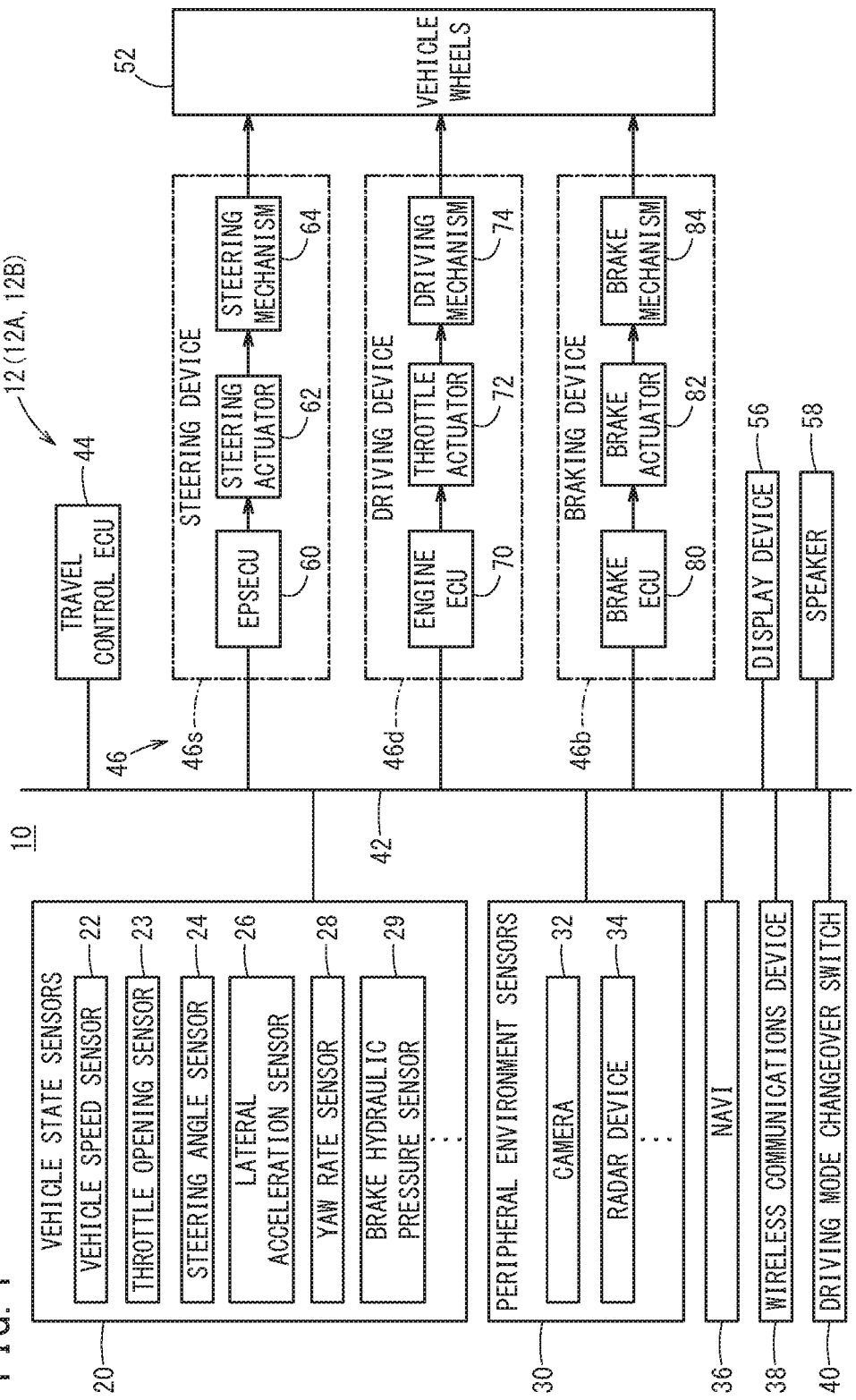
FIG. 1 is a block diagram showing the configuration of a vehicle equipped with a vehicle travel control device according to an embodiment of the present invention.

FIG. 1 is a block diagram showing the configuration of a vehicle 10 (hereinafter also referred to as a "host vehicle 10") equipped with a vehicle travel control device 12 according to the present embodiment.

The vehicle 10 is configured so as to be capable of switching between being an automated driven vehicle (including partial assistance of automated driving) or a manually driven vehicle. The vehicle 10 according to the present embodiment functions as an automatically driven vehicle.

As shown in FIG. 1, the vehicle travel control device 12 basically includes vehicle state sensors 20, peripheral environment sensors 30, a navigation device (NAVI) 36, a wireless communications device 38, a driving mode changeover switch 40, a wireless or wired in-vehicle communications line 42, a travel control ECU 44, actuators 46, and vehicle wheels 52.

The actuators 46, which are objects controlled by the travel control ECU 44 as control devices (control subjects) for automated driving, are constituted from a steering device 46s, a driving device 46d, and a braking device 46b.

The in-vehicle communications line 42 may be disposed on both sides of the travel control ECU 44, and may be constituted by the vehicle state sensors 20, the peripheral environment sensors 30, the navigation device (NAVI) 36, the wireless communications device 38, and the driving mode changeover switch 40 connected electrically to one communications line, and the steering device 46s, the driving device 46d, and the braking device 46b connected electrically to the other communications line.

An ECU (Electronic Control Unit) is a calculating device including a microcomputer, and includes a computation unit, a storage unit, and an input/output unit. By reading and executing programs stored in a ROM, the CPU functions as various function realizing units (function realizing means).

In the present embodiment, the respective contents of which will be described later, in addition to functioning as a control amount setting unit for calculating and setting control amounts Ac of the actuators 46, and a setting range restricting unit for restricting the setting range of the control amounts Ac, the travel control ECU 44 functions as a road type acquisition unit, a road shape acquisition unit, an obstacle detecting device, etc., and further functions as a part or all of a steering angle setting unit, an automatic steering device, an automatic acceleration/deceleration device, and a curvature acquisition unit.

The steering device 46s comprises an EPS (electric power steering) ECU 60, a steering actuator 62, and a steering mechanism 64.

The driving device 46d comprises an engine ECU 70, a throttle actuator 72, and a driving mechanism 74.

The braking device 46b comprises a brake ECU 80, a brake actuator 82, and a brake mechanism 84.

The vehicle state sensors 20 include, for example, a vehicle speed sensor 22, a throttle opening sensor 23, a steering angle sensor 24, a lateral acceleration (lateral G) sensor 26, a yaw rate sensor 28, and a brake hydraulic pressure sensor 29, which detect information on the state of the vehicle 10. The vehicle state sensors 20 function as a vehicle state detection unit.

The peripheral environment sensors 30 include, for example, a camera 32, a radar device 34, and the like, and detect information in relation to the peripheral environment such as the front, the sides, and the rear of the host vehicle 10. The peripheral environment sensors 30 function as a peripheral environment acquisition unit.

The navigation device 36 detects the current position of the vehicle 10 using a satellite device such as a GPS (Global Positioning System) device or the like, and guides the user (vehicle occupant) to a destination through a certain route. Further, the navigation device 36 includes a navigation storage unit in which map information is stored. The navigation device 36 detects or identifies the current position of the vehicle 10 on the basis of the position information from the GPS satellite and the map information stored in the storage device.

From the standpoint of detecting the current position of the vehicle 10, it is possible for the navigation device 36 to be used as one of the vehicle state sensors 20. Further, it is possible to be used as a peripheral environment sensor 30 that detects peripheral environmental information, which is information in relation to the peripheral environment surrounding the vehicle 10, such as road traffic regulations and road regulations, buildings, and POI (Point of Interest) information or the like in the vicinity of the current position of the vehicle 10.

The wireless communications device 38 communicates via a communications network such as the Internet or the like with other vehicles apart from the host vehicle 10, external devices of an external server or the like (including, for example, light beacons arranged on the roadside, or an external terminal arranged at a remote location). Accordingly, it is possible for the wireless communications device 38 as well to be used as a peripheral environment sensor 30 that detects peripheral environmental information, which is information in relation to the peripheral environment surrounding the vehicle 10, such as road traffic regulations, and road regulations or the like in the vicinity of the current position of the vehicle 10.

The driving mode changeover switch 40 is a switch which enables a vehicle occupant, for example the driver, to switch between manual driving and automated driving, and is disposed on an instrument panel (not shown).

The travel control ECU 44 acquires information from the vehicle state sensors 20, the peripheral environment sensors 30, the navigation device 36, and the wireless communications device 38, and generates action plans concerned with automated driving or automated driving assistance. In the action plans generated by the travel control ECU 44, there are included vehicle travel trajectories with respect to the travel route determined by the navigation device 36, and control amounts Ac (a steering control amount Ac-s, a drive control amount Ac-d, and a braking control amount Ac-b) along the vehicle travel trajectory.

The steering control amount Ac-s is output to the EPS ECU 60 of the steering device 46s from among the actuators 46.

The drive control amount Ac-d is output to the engine ECU 70 of the driving device 46d from among the actuators 46.

The braking control amount Ac-b is output to the brake ECU 80 of the braking device 46b from among the actuators 46.

On the basis of the steering control amount Ac-s, the EPS ECU 60 of the steering device 46s drives the vehicle wheels 52, for example, the front wheels, and generates a steering torque to thereby effect steering through the steering actuator 62 and the steering mechanism 64, in a manner so that the actual steering amount becomes the steering control amount Ac-s.

Moreover, as is well known, the steering actuator 62 is constituted by an electric motor, and the steering mechanism 64 includes a pinion which is rotated by the steering actuator 62 (electric motor), a rack which is capable of being moved reciprocally by rotation of the pinion, and tie rods that transmit reciprocal movement of the rack to the vehicle wheels 52 (front wheels). As noted previously, the vehicle wheels 52 generate the steering torque corresponding to the steering control amount Ac-s. Moreover, the steering device 46s is not limited to being an electric type, and may be a hydraulic type of steering device.

On the basis of the drive control amount Ac-d, the engine ECU 70 of the driving device 46d drives the vehicle wheels 52 and generates a driving torque to thereby enable traveling through the throttle actuator 72 and the driving mechanism 74 (including the engine and the transmission), in a manner so that the actual drive amount becomes the drive control amount Ac-d.

The throttle actuator 72 is constituted, for example, by an electric motor, and adjusts the throttle opening of the throttle valve on the basis of the drive control amount Ac-d to thereby increase or suppress the engine output, and rotates the vehicle wheels 52 through the transmission. In this instance, the driving device 46d is not limited to being a conventional engine, but may be a hybrid type used in combination with an electric motor, or a so-called electrical type in which only an electric motor is used. In the case of an electrical type, in addition to an electric vehicle, the vehicle 10 may include a fuel cell vehicle or the like.

Accordingly, the drive control amount Ac-d may include, in addition to the throttle opening, an engine rotational speed, an engine brake, a motor torque, a regenerative brake by the motor, and a shift operation or the like.

On the basis of the braking control amount Ac-b, the brake ECU 80 of the braking device 46b generates a braking force for braking the vehicle wheels 52 through the brake actuator 82 and the brake mechanism 84, in a manner so that the actual braking amount becomes the braking control amount Ac-b.

Moreover, the brake actuator 82 is constituted, for example, from a master cylinder and an ABS actuator, and transmits a brake hydraulic pressure to the brake mechanism 84. The brake mechanism 84 is made up from a drum brake or a disc brake, and applies a frictional braking force to the vehicle wheels 52. The braking control amount Ac-b includes a shift operation in addition to the braking hydraulic pressure.

A display device 56 carries out a display in relation to automated driving. The display device 56 may be configured, for example, as a portion of a meter of the instrument panel. Alternatively, the display device 56 may be used in a dual manner with a display unit of the navigation device 36.

A speaker 58 carries out a voice output (voice guidance, voice warning, etc.) in relation to automated driving. The speaker 58 may be configured as a portion of an audio device or the navigation device 36.

Operations of the vehicle travel control device 12 according to the present embodiment, which is configured basically as described above, will be explained with reference to flowcharts of controls and the like executed by the travel control ECU 44, on the basis of a relationship with the vehicle 10 in which the vehicle travel control device 12 is installed.

In the exemplary operations to be described below, it is assumed that the vehicle 10 is undergoing traveling on a road by automated driving on the basis of the aforementioned action plans. Accordingly, all of the flowcharts described below are executed repeatedly at a predetermined processing cycle in which travel by automated driving can be carried out smoothly. Further, in order to avoid complexity when explaining such operations, descriptions concerning an execution subject (i.e., the travel control ECU 44) which executes the programs according to the flowchart will be appropriately omitted.

Exemplary Embodiment

In step S1, the travel control ECU 44, which in this instance functions as a road type acquisition unit, acquires information of the road type RD (described later) of a frontward lane in which traveling is to take place henceforth, based on information [combined information of objects (node-link-node objects) from the current position to a destination and including as accompanying information of the links the speed limit (maximum speed), etc., of the road] of the travel route, which is generated by the navigation device 36 or the like and stored in its own storage device.

Next, in step S2, on the basis of the road type RD acquired in step S1, an environmental restriction amount Aer is acquired.

Figure 3:
FIG. 3 is an illustrative explanatory diagram of an environment table.

When acquiring the environmental restriction amount Aer, as shown in an environment table 90 of FIG. 3, environmental restriction amounts Aer [in this instance, as an example, lateral G forces which may be applied to the vehicle 10 (including an occupant)] based on road types RD are stored beforehand in the travel control ECU 44.

As can be understood from the environment table 90, for example, with a road type RD of a general road, the environmental restriction amount Aer is set to be equivalent to 0.2 G and stored, with an expressway (main lanes with median strip), it is set to be equivalent to 0.25 G and stored, with an expressway (branching, merging paths), it is set to be equivalent to 0.25 G and stored, with an expressway [roads having a large curvature (a small radius of curvature) such as a ramp (in a case where the road is defined by a three-dimensional intersection, where inclined roads mutually interconnect cross-connecting roads) or the like], it is set to be equivalent to 0.3 G and stored, and with an expressway (no median strip), it is set to be equivalent to 0.2 G and stored.

If apart from the above-described general roads or expressways, the possibility of coming into contact with an obstacle or coming into contact with an oncoming vehicle is probabilistically high, in the road type RD, there may also be included roads (schools zones, or roads of a narrow lane width) that are predefined in association with the map information of the navigation device 36 or the like.

Next, in step S3, the travel control ECU 44, which in this instance functions as a road shape acquisition unit, acquires or calculates the road shape RS of the frontward lane from a high accuracy road network map stored beforehand in its own storage device, or from [forward image information captured by the camera 32 and/or forward object information detected by the radar device 34 of] the peripheral environment sensors 30.

In this instance, within the road shape RS, there is included information such as the road width, an increase or decrease in the road width, the inclination of uphill or downhill roads, the curvature (road curvature RC) or the radius of curvature of turning roads, and winding roads (bent roads) and the like.

Next, in step S4, on the basis of the information of the road type RD, the information of the road shape RS, and the information of the travel route, the travel control ECU 44, which in this instance functions as a control amount setting unit, calculates the action plans [including the vehicle travel trajectories with respect to the travel route, the necessary control amounts Anc which are control amounts necessary for automated driving along the vehicle travel trajectories (the steering control amount Ac-s such as the steering torque set in the EPS ECU 60, the drive control amount Ac-d such as the throttle opening set in the engine ECU 70, and the braking control amount Ac-b set in the brake ECU 80), and the like].

In the case that the travel control ECU 44 controls the steering device 46s, the driving device 46d, and the braking device 46b, which make up the actuators 46, by the necessary control amounts Anc which were calculated in the foregoing manner, then provisionally, for example, due to slight disturbances caused by local fluctuations in the road surface conditions, such as local increases or decreases in the coefficient of friction, there is a possibility for the automated driving control to be canceled, and for the continuity range of the automated driving control to be disadvantageously narrowed.

In order to resolve such a possibility, in step S5, a necessary restriction amount Anr is calculated in which there is added to the necessary control amounts Anc that were calculated in step S4, a control mitigation amount $\beta$, which is determined beforehand in consideration of a constant value or information of the road shape RS (in the present exemplary embodiment, the road curvature RC, as will be described later) and disturbances in the road surface conditions or the like (Anr←Anc+$\beta$).

Next, in step S6, a determination is made as to whether or not the necessary restriction amount Anr is less than the environmental restriction amount Aer that was calculated in step S2.

If the necessary restriction amount Anr is less than the environmental restriction amount Aer (step S6: YES), then in step S7, a restriction amount Ar is set to the necessary restriction amount Anr (Ar←Anr).

Next, in step S8, the automated driving control is continued with the necessary control amounts Anc, under a condition in which the setting range of the restriction amount Ar is expanded up to the necessary restriction amount Anr.

On the other hand, if it is determined in step S6 that the necessary restriction amount Anr is greater than the environmental restriction amount Aer (step S6: NO), the travel control ECU 44 prohibits the automated driving control and then terminates the automated driving control (step S9).

When the automated driving control is prohibited, the travel control ECU 44 issues a notification with respect to the vehicle occupant (driver) using the display device 56, the speaker 58, or the like, to the effect that automated driving cannot be implemented, and the automated driving control may be prohibited and the automated driving control may be terminated, in the case it is detected that an operation for automatically shifting the driving mode changeover switch to a manual driving mode, such as an operation of the vehicle occupant grasping the steering wheel or the like, has been performed.

Figure 4:
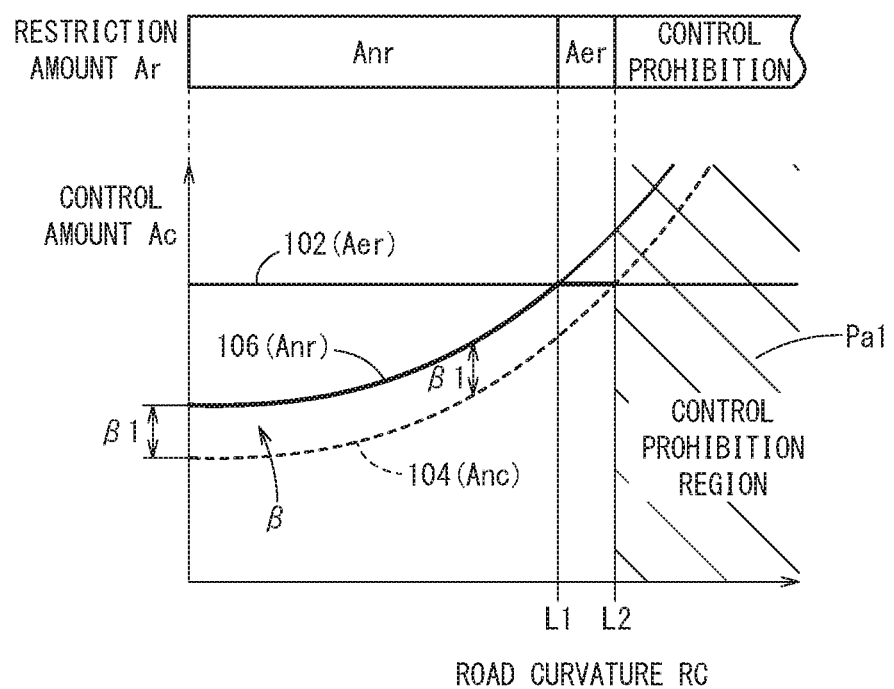

FIG. 4 shows, as one example, that the horizontal axis represents the road curvature RC which is information of the road shape RS, whereas the vertical axis represents the control amount Ac, and examples are drawn of a characteristic 102 of the environmental restriction amount Aer, a characteristic 104 of the necessary control amounts Anc, and a characteristic 106 of the necessary restriction amount Anr in which the control mitigation amount $\beta = \beta 1$ (a constant value) is added to the aforementioned characteristic 104 of the necessary control amounts Anc. Moreover, in the characteristic diagram of FIG. 4, the origin of the road curvature RC in the lower left-hand corner signifies a straight road having a road curvature of zero (RC=0).

The road curvature RC at the intersection coordinates of the characteristic 102 of the environmental restriction amount Aer and the characteristic 106 of the necessary restriction amount Anr are defined as a limit curvature L1, and the road curvature RC at the intersection coordinates of the characteristic 102 of the environmental restriction amount Aer and the characteristic 104 of the necessary control amounts Anc are defined as a limit curvature L2.

As can also be understood from FIG. 4, a region in which the road curvature RC (RC>L2) becomes a curvature for which the necessary control amounts Anc exceed the environmental restriction amount Aer is set as a control prohibited region Pa1 (step S6: NO step S9).

More specifically, according to the present exemplary embodiment, until reaching the range of the limit curvature (road curvature) L1, the restriction amount Ar of the necessary control amounts Anc is set to Ar=the necessary restriction amount Anr, and within a range from the limit curvature (road curvature) L1 to the limit curvature (road curvature) L2, the restriction amount Ar of the necessary control amounts Anc is set to Ar=the environmental restriction amount Aer.

Stated otherwise, the travel control ECU 44, which functions as the setting range restricting unit, takes into consideration the environmental restriction amount Aer on the basis of the information of the road type RD, and the road curvature RC on the basis of the information of the road shape RS. Further, within the control region from where the road curvature RC is zero (RC=0) and until reaching the limit curvature L1, the setting range is enlarged until the necessary control amounts Anc reach the necessary restriction amount Anr (the priority of the necessary restriction amount Anr to which there is added the controlled mitigation amount $\beta$ in relation to information of the road shape RS is considered to be higher), whereas within the control region up until the limit curvature L2 in which the road curvature RC is in excess of the limit curvature L1, the necessary control amounts Anc are controlled by enlarging the setting range up to the environmental restriction amount Aer (the priority of the environmental restriction amount Aer is considered to be higher).

[Modification 1]

Figure 5:
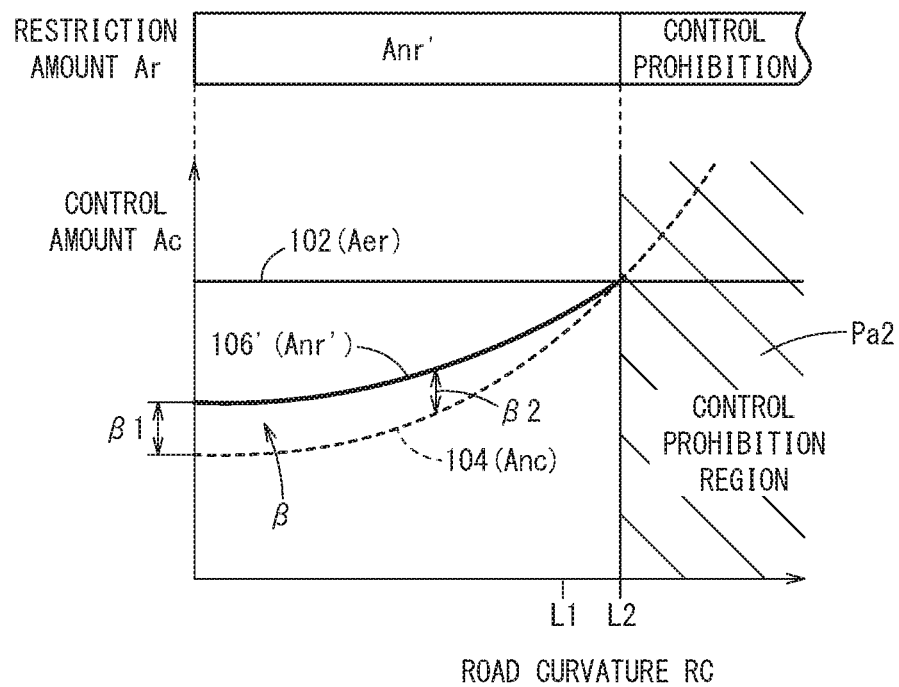
FIG. 5 is a characteristic diagram for describing another example of settings of the necessary restriction amount.

FIG. 5 is a characteristic diagram of the control amount Ac with respect to the road curvature RC, for describing the configuration and operations of a vehicle travel control device 12A according to Modification 1.

Figure 2:
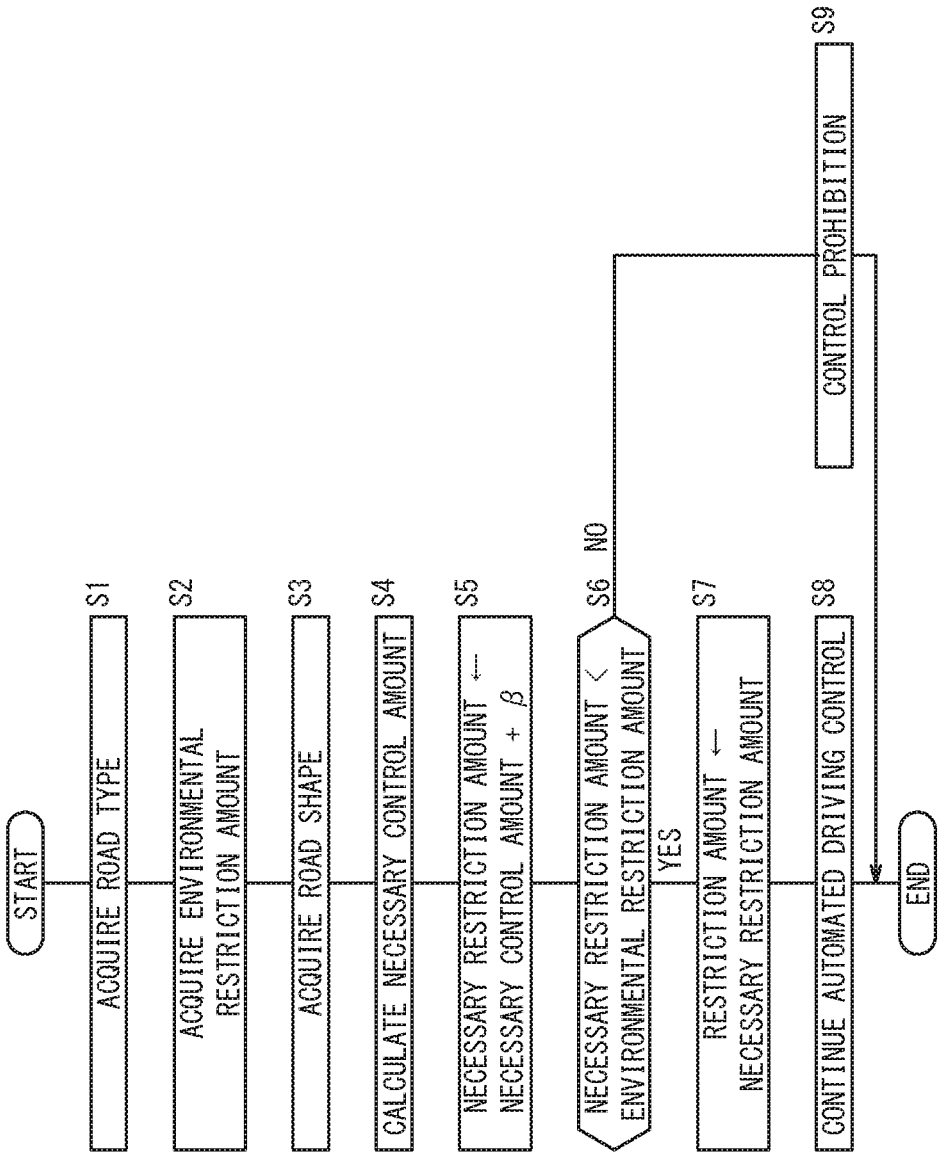
FIG. 2 is a flowchart for describing operations of the vehicle travel control device shown in FIG. 1.

In the vehicle travel control device 12A according to Modification 1, the manner in which the necessary restriction amount Anr is calculated in Step S5 differs from that shown in the flowchart of FIG. 2.

In the above-described exemplary embodiment, the control mitigation amount β is set to the control mitigation amount β1 which is a constant value. However, with the vehicle travel control device 12A according to Modification 1, as shown by the change characteristics of the control mitigation amount β in FIG. 5, the control mitigation amount β is set so as to become a smaller value, for example as indicated by the control mitigation amount β2 or the like, as the necessary control amounts Anc increase from the control mitigation amount β1 when the necessary control amounts Anc are at a minimum value (for example, corresponding to a value where the road curvature RC is zero (RC=0)). In accordance with this feature, the necessary restriction amount Anr of the characteristic 106 is corrected to a necessary restriction amount (which may be referred to as a corrected necessary restriction amount) Anr' as indicated by the characteristic 106'.

In the vehicle travel control device 12A according to Modification 1, within a range from the road curvature RC being a zero value and until reaching the limit curvature L2, the restriction amount Ar of the necessary control amounts Anc is set to Ar=the necessary restriction amount Anr', and in a range in excess of the limit curvature L2, the control prohibition region Pa2 is entered into.

With the vehicle travel control device 12A according to Modification 1, by setting to the necessary restriction amount Anr' the value obtained by adding the control mitigation amount β (β1, β2) to the necessary control amounts Anc, it is possible to prevent the control amount Ac from being restricted excessively with respect to a slight increase (the increase in the control amount Ac on the vertical axis in FIG. 5) in the necessary control amounts Anc.

Further, since it is possible to reduce the amount by which the necessary restriction amount Anr' is increased accompanying the increase in the necessary control amounts Anc, provisionally, in the case that the necessary restriction amount Anr' on the basis of the information of the road shape RS is lower than the environmental restriction amount Aer on the basis of the information of the road type RD, then from the fact that it becomes difficult to change the setting value from the necessary restriction amount Anr' to the environmental restriction amount Aer, it is possible to improve the tracking ability of the output of the actuators 46 with respect to the road shape RS.

Although the road curvature RC is raised as an example of the road shape RS, instead of the road curvature RC, the road shape RS may be defined by a road width (a lane width of the road) as was described above. In this case, the road type RD on the vertical axis in FIG. 5 is taken to be a general road, and the environmental restriction amount Aer and the necessary control amounts Anc are set accordingly. In addition, a control may be performed so that, in the same manner as the control mitigation amount β being made smaller as the road curvature RC becomes larger, the control mitigation amount β is made smaller as the road width in the road shape RS on the horizontal axis becomes narrower.

[Modification 2]

Figure 6:
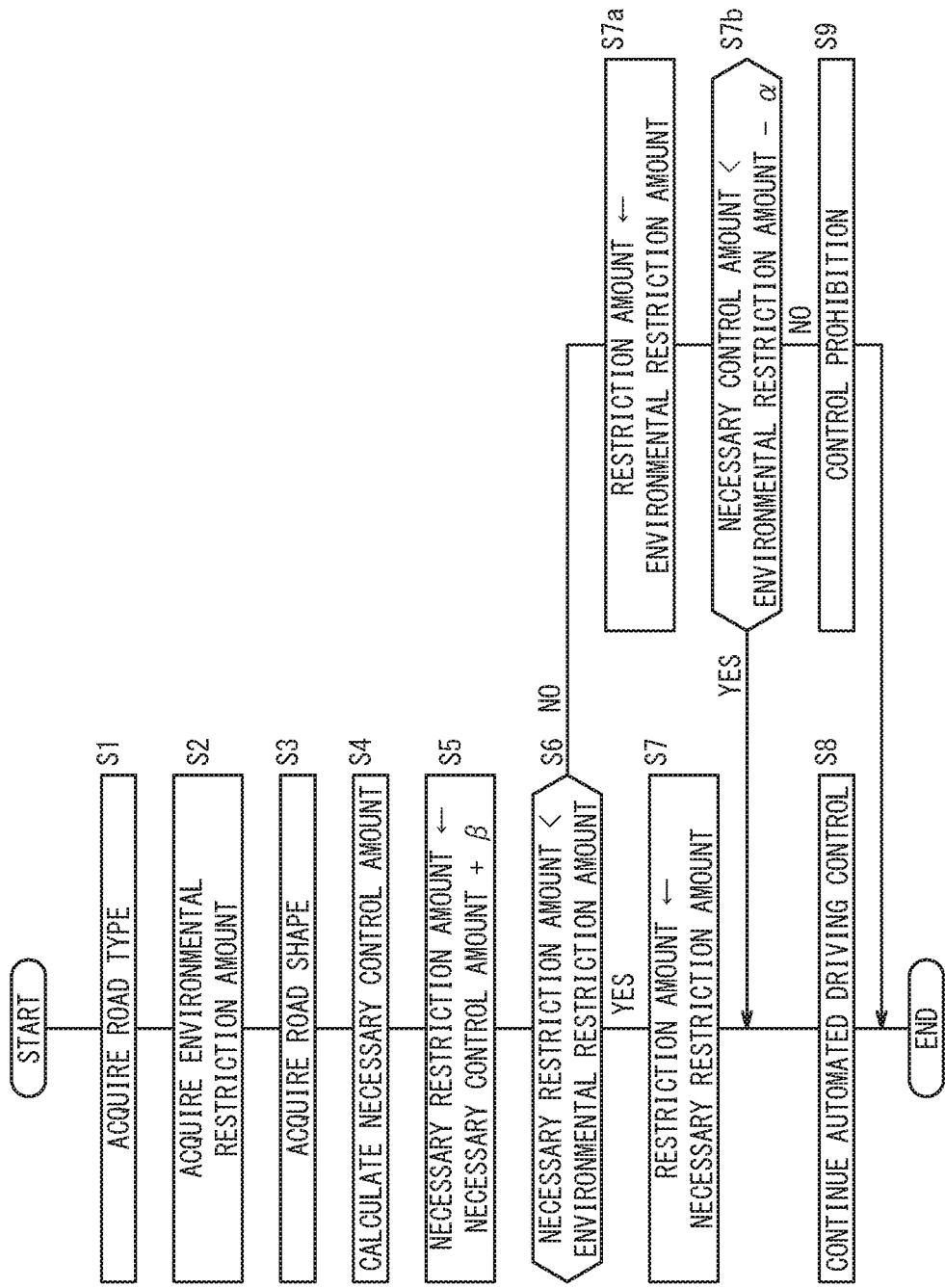
FIG. 6 is a flowchart for describing operations of the vehicle travel control device in the case of using a modified environmental restriction amount.
Figure 7:
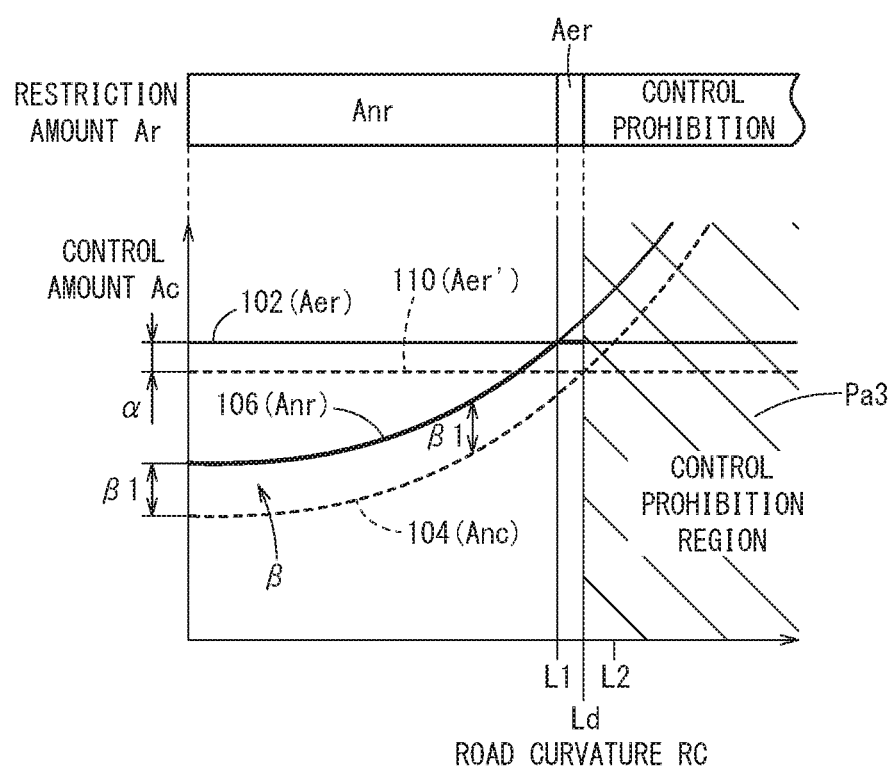
FIG. 7 is a characteristic diagram of the vehicle travel control device that executes the flowchart of FIG. 6.

FIG. 6 is a flowchart for describing operations of a vehicle travel control device 12B according to Modification 2, and FIG. 7 is a characteristic diagram of the control amount Ac with respect to road curvature RC, for describing the configuration and operations of the vehicle travel control device 12B according to Modification 2.

The flowchart of FIG. 6 differs from the flowchart of FIG. 2 in that, in comparison with the flowchart of FIG. 2, the process of step S7a and the determination of step S7b are added.

In this case, in step S6, if the necessary restriction amount Anr is greater than the environmental restriction amount Aer (step S6: NO), then in step S7a, the restriction amount Ar is set to the environmental restriction amount Aer.

Next, in step S7b, a determination is made as to whether or not the necessary control amounts Anc are less than a value (assumed to be the corrected environmental restriction amount Aer' as indicated by a characteristic 110) obtained by subtracting a restriction enhancement amount α, which is a predetermined restriction amount, from the environmental restriction amount Aer (Anc<Aer'=Aer−α).

If the determination of step S7b is affirmative (step S7b: YES), then even within the region in which the necessary restriction amount Anr is greater than the environmental restriction amount Aer (the region where the road curvature RC is L1 to Ld), the restriction amount Ar is set to the environmental restriction amount Aer (step S7a), and the automated driving control is continued in step S8.

Moreover, in the case that the necessary control amounts Anc become greater than the corrected environmental restriction amount Aer' (Aer'=Aer−α) and the determination of step S7b becomes negative (step S7b: NO), or stated otherwise, if the road curvature RC lies within the region in excess of the limit curvature L2, then as described above, in step S9, the control is prohibited.

In the vehicle travel control device 12B according to Modification 2, within a range from the road curvature RC being a zero value and until reaching the limit curvature L1, the restriction amount Ar of the necessary control amounts Anc is set to Ar=the necessary restriction amount Anr, and within a range until the road curvature RC reaches a limit curvature Ld in excess of the limit curvature L1, the restriction amount Ar of the necessary control amounts Anc is set to Ar=the environmental restriction amount Aer, and in a range in excess of the limit curvature Ld, the control prohibition region Pa3 is entered into.

With the vehicle travel control device 12B according to Modification 2, in the case that the necessary control amounts Anc of the actuators 46 required for the vehicle 10 to travel on the frontward road exceeds the corrected environmental restriction amount Aer' obtained by subtracting the restriction enhancement amount α from the environmental restriction amount Aer, or in this case, the road curvature RC exceeds the limit curvature Ld, it is difficult for the travel assist control to follow or track with respect to the road shape RS of the road type RD at the point in time when such an excess takes place. Therefore, by canceling or prohibiting the travel assist control, for example, it is possible to stop the vehicle 10 or transition the driving thereof to the vehicle occupant, thereby making it possible to prevent the travel assist control from becoming unstable.

Summary of Exemplary Embodiments

In general, the steering restriction amount, which for example, is a limit value used in an automatic steering control, is set to a comparatively small value of a degree by which contact with an oncoming vehicle can be avoided.

However, if the steering restriction amount is set to such a small value, and in the case that a lane keeping system, for example, is operated on an expressway or the like, from the fact that the steering control amount is restricted by the small value on a turning road with a small radius of curvature, there is a possibility that an alarm will be generated due to the steering control amount being insufficient, and indicating departure from the lane during automated driving.

In contrast thereto, according to the present embodiment, the restriction amount Ar, which is a limit value of the control amount Ac, is set respectively to the environmental restriction amount Aer, which is changed on the basis of the road type RD, or the necessary restriction amount Anr, which is changed on the basis of the road shape RS, whereby, even with a small steering amount, for example, on a road having a narrow road width, for which there is a high possibility of coming into contact with oncoming vehicles, the restriction amount Ar is made small in order to enhance or intensify the restriction, whereas on the other hand, on a wide expressway or the like having a median strip, the restriction is mitigated and the restriction amount Ar can be made large, and therefore, it is possible to expand the setting range in which the automated driving control can be implemented.

Therefore, even when a large steering amount (steering angle) is required, such as at a ramp road at an entry pathway or an exit pathway onto/from an expressway where the radius of curvature is small (the road curvature RC is large), by setting the environmental restriction amount Aer which is a restriction amount Ar corresponding to the information of the road type RD or a restriction amount Ar corresponding to the information of the road shape RS, it is possible to enlarge the possibility of being able to pass through places where passage was not possible with the control amounts Ac used up till now.

As has been described above, the vehicle travel control devices 12, 12A, 12B according to the above-described embodiment, Modification 1, and Modification 2 at least partially assist driving in accordance with automatically setting the control amounts Ac of the actuators 46 of the vehicle 10 during traveling of the vehicle 10.

The vehicle travel control devices 12, 12A, 12B are each equipped with the road type acquisition unit (a function of the travel control ECU 44, for example, step S1) configured to acquire information of a road type RD on which the vehicle 10 travels, the road shape acquisition unit (a function of the travel control ECU 44, for example, step S3) configured to acquire information of a road shape RS of a road in front of a location where the vehicle 10 is traveling, a control amount setting unit (a function of the travel control ECU 44, for example, step S4) configured to set control amounts Ac of the actuators 46 required for traveling on the road, and the setting range restricting unit (functions of the travel control ECU 44, for example, steps S6 and S7) configured to restrict the setting range of the control amount Ac on the basis of one of the information items having a higher priority from among the information of the road type RD and the information of the road shape RS.

In accordance with such a configuration, since the setting range of the control amount Ac to the actuators 46 that perform the travel assist control is restricted on the basis of one of the information items having a higher priority from among the information of the road type RD and the information of the road shape RS, compared to a case in which the setting range of the control amount Ac is determined based on only one such information item, it is possible to prevent the restriction on the control amount Ac from being mitigated more than necessary, and to suppress the occurrence of an excessive output by the actuators 46 which have been set with the mitigated control amount Ac, and together therewith, conversely, it is possible to prevent the control amount Ac from being restricted more than necessary, and to prevent the applicable range or the continuation time of the driving assistance from being made too narrow. As a result, it is possible to achieve both stability of the vehicle behavior during the travel assist control and continuity of the travel assist.

In this case, the setting range restricting unit (functions of the travel control ECU 44, for example, steps S6 and S7) is preferably configured to define the setting range of the control amount Ac, which is restricted based on the information of the road type RD acquired by the road type acquisition unit (step S1), as the environmental restriction amount Aer, and on the other hand, preferably configured to define the setting range of the control amount Ac, which is restricted based on the information of the road shape RS acquired by the road shape acquisition unit (step S3), as the necessary restriction amount Anr, and further, preferably configured to restrict the setting range of the control amount Ac on the basis of a smaller value from among the necessary restriction amount Anr and the environmental restriction amount Aer.

In accordance with the above-described configuration, since it is possible to set priorities to the environmental restriction amount Aer and the necessary restriction amount Anr, which are set respectively in accordance with the information of the road type RD and the information of the road shape RS, the setting range of the control amount Ac is restricted based on the smaller of such values, whereby it is possible to achieve both stability of the vehicle behavior during the travel assist control and continuity of the travel assist.

In this case, the control amounts Ac of the actuators 46 required for traveling on the frontward road, which are set by the control amount setting unit (step S4), are defined as the necessary control amounts Anc, and the setting range restricting unit (step S5) is configured to define as the necessary restriction amount Anr a value obtained by adding the control mitigation amount β to the necessary control amounts Anc, and set the control mitigation amount β so as to adopt a value β1 when the necessary control amounts Anc is smallest, and adopt a smaller value β2 as the necessary control amounts Anc becomes larger (see FIG. 5).

By defining as the necessary restriction amount Anr the value obtained by adding the control mitigation amount β to the necessary control amounts Anc, it is possible to suppress a control amount Ac which is restricted excessively with respect to a slight increase in the necessary control amounts Anc.

Further, since it is possible to reduce the amount by which the necessary restriction amount Anr is increased accompanying the increase in the necessary control amounts Anc, provisionally, in the case that the necessary restriction amount Anr on the basis of the information of the road shape RS is lower than the environmental restriction amount Aer on the basis of the information of the road type RD, then from the fact that it becomes difficult to change the setting value from the necessary restriction amount Anr to the environmental restriction amount Aer, it is possible to improve the tracking ability of the output of the actuators 46 with respect to the road shape RS.

Moreover, in the case that the necessary control amounts Anc are values exceeding the environmental restriction amount Aer, or alternatively, are values exceeding the corrected environmental restriction amount Aer' (Aer−α) obtained by subtracting the restriction enhancement amount α, which is a predetermined restriction amount, from the environmental restriction amount Aer, the travel assist control for the vehicle 10 may be at least partially canceled or prohibited.

In this manner, in the case that the necessary control amounts Anc of the actuators 46 required for the vehicle 10 to travel on the frontward road exceed the environmental restriction amount Aer set by the information of the road type RD, or the corrected environmental restriction amount Aer' obtained by subtracting the restriction enhancement amount α from the environmental restriction amount Aer, it is difficult for the travel assist control to follow or track with respect to the road shape RS of the road type RD at the point in time when such an excess takes place. Therefore, by canceling or prohibiting the travel assist control, for example, it is possible to stop the vehicle 10 or transition the driving thereof to the vehicle occupant, thereby making it possible to prevent the travel assist control from becoming unstable.

Further, as another modification, the peripheral environment sensors 30 may be provided as an obstacle detecting device configured to detect an obstacle (including a preceding or following vehicle as well as a stationary obstacle) in the vicinity (front, rear, left, and right) of the vehicle 10 during the automatic travel control, whereby the travel control ECU 44, which functions as a setting range restricting unit, may be configured to change or set the environmental restriction amount Aer or the necessary restriction amount Anr, which serves as the restriction amount Ar (setting range) of the control amount Ac depending on the possibility of the vehicle 10 coming into contact with the obstacle detected by the peripheral environment sensors 30.

In accordance with the above-described configuration, in the travel assist control, it is possible to reduce the possibility of contact with an obstacle accompanying an excessive output of the actuators 46.

In this case, if there is a possibility of the vehicle 10 departing from the lane, for example, due to being controlled excessively, or if there is a possibility of contact with a preceding vehicle or a following vehicle due to rapid acceleration or deceleration, the environmental restriction amount Aer is changed to make it smaller. The necessary restriction amount Anr is set in the case that the necessary control amounts Anc are secured in order to carry out obstacle avoidance.

As yet another modification, there may further be provided a steering angle setting unit (travel control ECU 44) configured to set the steering angle on the basis of the travel direction of the vehicle 10, an automatic steering device (EPS ECU 60) configured to automatically steer the steering actuator 62 so as to attain the required control steering angle (necessary control amount Anc) set by the steering angle setting unit, and an automatic acceleration/deceleration device (the engine ECU 70 and the brake ECU 80) configured to automatically control acceleration and deceleration of the vehicle 10. The road shape acquisition unit (step S3) may further comprise a curvature acquisition unit (the travel control ECU 44 which acquires the curvature on the basis of information from the navigation device 36 and the camera 32) configured to acquire the curvature, and more specifically, the road curvature RC of the road in the frontward travel direction of the vehicle 10. The environmental restriction amount Aer may be set as a value (environmental restriction steering angle=environmental restriction amount Aer) that restricts the steering angle during automatic steering, on the basis of the information of the road type RD acquired by the road type acquisition unit (step S1), and the setting range restricting unit (step S5, step S6) may be configured to restrict the steering angle on the basis of a smaller value from among the environmental restriction amount Aer and the necessary restriction amount Anr, and together therewith, in the case that the road curvature RC acquired by the curvature acquisition unit (step S3) is a value exceeding a limit curvature L2, which is a threshold curvature, automatic steering by the EPS ECU 60 serving as the automatic steering device may be canceled or prohibited, or the vehicle 10 may be configured to be decelerated by the engine ECU 70 and the brake ECU 80 serving as the automatic acceleration/deceleration device.

In the foregoing manner, in the case that the road curvature RC becomes a value in excess of the limit curvature L2 which is a threshold curvature, by canceling or prohibiting automatic steering, it is possible to prevent the automatic steering control from becoming unstable.

Alternatively, in the case that the road curvature RC becomes a value in excess of the limit curvature L2 which is a threshold curvature, by causing the vehicle 10 to decelerate, since the necessary steering angle becomes smaller for the same road curvature RC, the continuity of the automatic steering control can be improved.

Moreover, as yet another modification, the environmental restriction amount Aer may be set as a value that restricts the acceleration and deceleration in the automatic acceleration/deceleration device (engine ECU 70 and brake ECU 80) on the basis of the information of the road type RD acquired by the road type acquisition unit (step S1), the necessary restriction amount Anr may be set as a value that restricts the acceleration and deceleration in the automatic acceleration/deceleration device (engine ECU 70 and brake ECU 80) on the basis of the information of the road shape RS acquired by the road shape acquisition unit (step S3), and the setting range restricting unit (step S6) may be configured to restrict the acceleration and deceleration that is automatically controlled by the automatic acceleration/deceleration device (engine ECU 70 and brake ECU 80) on the basis of a smaller value from among the environmental restriction amount Aer and the necessary restriction amount Anr.

In this manner, even in the automatic acceleration/deceleration control, since priorities can be assigned to the environmental restriction amount Aer and the necessary restriction amount Anr which are set respectively for the road type RD and the road shape RS, it is possible to achieve both stability of the vehicle behavior and continuity of automated driving.

The present invention is not limited to the above-described embodiment and other embodiments, and based on the disclosed content of the present specification, it is a matter of course that various alternative configurations may be adopted.

What is claim is:

1. A vehicle travel control device configured to automatically control an actuator of a vehicle to at least partially assist driving operation when the vehicle is traveling, the actuator relating to steering, driving, or braking of the vehicle, comprising:
   a processor that executes instructions to perform operations, comprising:
   acquiring information of a road type on which the vehicle travels;

acquiring information of a road shape of a frontward road in front of a location where the vehicle is traveling;

setting a control amount of the actuator required for traveling on the frontward road; and restricting a setting range of the control amount on a basis of one of information items having a higher priority from among the information of the road type and the information of the road shape, wherein the restricting further comprises:

defining the setting range of the control amount of the actuator, which is restricted based on the information of the road type, as an environmental restriction amount, and defining the setting range of the control amount of the actuator, which is restricted based on the information of the road shape, as a necessary restriction amount; and restricting the setting range of the control amount on a basis of a smaller value from among the necessary restriction amount and the environmental restriction amount.

2. The vehicle travel control device according to claim 1, wherein the operations further comprise:

wherein the control amount of the actuator required for traveling on the frontward road is defined as a necessary control amount; and defining as the necessary restriction amount a value obtained by adding a control mitigation amount to the necessary control amount, and setting the control mitigation amount so as to adopt a smaller value as the necessary control amount becomes larger.

3. The vehicle travel control device according to claim 2, wherein, in a case that the necessary control amount is a value exceeding the environmental restriction amount, or alternatively, is a value exceeding a corrected environmental restriction amount obtained by subtracting a predetermined restriction amount from the environmental restriction amount, a travel assist control for the vehicle is at least partially canceled or prohibited.

4. The vehicle travel control device according to claim 1, wherein the operations further comprise detecting an obstacle in vicinity of the vehicle, and wherein changing the setting range of the control amount depending on a possibility of the vehicle coining into contact with the obstacle.

5. The vehicle travel control device according to claim 1, wherein the operations further comprise:

setting a steering angle on a basis of a travel direction of the vehicle;

automatically steering the actuator so as to attain the steeling angle; and automatically controlling acceleration and deceleration of the vehicle;

acquiring a road curvature of the road in the frontward travel direction of the vehicle;

setting the environmental restriction amount as a value that restricts the steering angle during automatic steering, on a basis of the information of the road type; and restricting the steering angle on the basis of a smaller value from among the environmental restriction amount and the necessary restriction amount, and together therewith, in a case that the road curvature is a value exceeding a threshold curvature, canceling or prohibiting automatic steeling, or the vehicle is configured to be decelerated.

6. The vehicle travel control device according to claim 5, wherein:

the environmental restriction amount is set as a value that restricts the acceleration and deceleration based on the information of the road type;

the necessary restriction amount is set as a value that restricts the acceleration and deceleration based on the information of the road shape; and restricting the acceleration and deceleration based on a smaller value from among the environmental restriction amount and the necessary restriction amount.

* * * * *